United States Patent [19]

Smith et al.

[11] Patent Number: 5,204,960
[45] Date of Patent: Apr. 20, 1993

[54] INCREMENTAL COMPILER

[75] Inventors: Steven P. Smith, Issaquah; Andrew D. Padawer, Redmond; David T. Jones, Preston; Gregory F. Whitten, Bellevue; Craig H. Wittenberg, Redmond, all of Wash.

[73] Assignee: Microsoft Corporation, Redmond, Wash.

[21] Appl. No.: 462,502

[22] Filed: Jan. 8, 1990

[51] Int. Cl.[5] .............................................. G06F 9/06
[52] U.S. Cl. ............................. 395/700; 364/DIG. 1; 364/280.4
[58] Field of Search ... 364/200 MS File, 900 MS File, 364/DIG. 1 MS File, DIG. 2 MS File; 395/700

[56] References Cited

U.S. PATENT DOCUMENTS

| | | | |
|---|---|---|---|
| 4,374,408 | 2/1983 | Bowles et al. | 364/200 |
| 4,558,413 | 12/1985 | Schmidt et al. | 364/DIG. 1 |
| 4,672,532 | 6/1987 | JongeVos | 364/200 |
| 4,734,854 | 3/1988 | Afshar | 364/200 |
| 4,914,585 | 4/1990 | Packard et al. | 364/200 |

Primary Examiner—Thomas M. Heckler
Attorney, Agent, or Firm—Seed and Berry

[57] ABSTRACT

A system and method of incrementally coupling a high level language into an object file is disclosed. A source file and an object file are organized into logical blocks. An intermediate file, termed an .mdt file, is generated and stores information about the logical blocks in both the source file and the object file and their relationship to each other. Boundaries are established in the source program to define logical blocks within it, each block being termed a function. Each function is further divided into a global region and a local region. If a change has been made in a particular local region in the source file, only that region is recompiled. The recompiled portion of the .obj file is patched into the .obj file to replace the previous material corresponding to that region. Significant time savings is realized by incrementally compiling the source program because only those local regions which have been changed are recompiled and they are patched into the existing .obj file.

13 Claims, 8 Drawing Sheets

INCREMENTAL COMPILER

DESCRIPTION

1. Technical Field

This invention relates to a method and system for compiling a high level language into an object code file and more particularly for compiling only those portions of an object file corresponding to changed portions of the high level language file.

2. Background of the Invention

Programs are generally written in a high level language, such as FORTRAN, C, Pascal, basic or the like. A user writes programs in a high level language to direct the computer to execute certain commands. Commands in a high level language are relatively easy to learn and a user can run many programs on many different computers using the same high level language commands Computers, on the other hand, cannot execute commands from a level languages. Each type of microprocessor understands and executes commands using only a set of commands unique to it. The high level language must be compiled, that is, translated, from the high level language to a machine readable language Compiling a program in a high level language to machine executable code is well known in the art. After the entire program is written in the high level language, the user requests that the program be compiled for execution in machine language A software program known as a compiler reads the commands and data in the high level language and generates an object (".obj") file having machine readable code corresponding to the commands of the high level language. A second software program known as a linker may also be used. A linker generates a machine executable code (".exe") file from a collection of .obj file. The .obj file may have code corresponding to a single command or data string in many different places throughout the file.

One shortcoming of the prior art is the time required to generate an .obj file from a high level language program file. The compiler must read each line of the program file, generate machine code corresponding to the command, allocate address in memory, provide directions for the linker, divide the code into logical segments, and many other jobs. From a few moments to over one minute may be taken for an .obj file to be compiled from a relatively short program, whereas a long program may require several minutes to compile The user may change one or two lines in the program, because of an error in execution, modification in a command or adding data. Unfortunately, the entire program must be recompiled and an entire new .obj program generated each time even a small change is made in the program. The user must thus wait from few moments up to several minutes while the compiler generates a new .obj file to run the program again on the computer. If another change is made, the entire file must be compiled again. A user is inconvenienced in having to wait for a full recompile of the .obj file each time a change is made in the high level language program.

SUMMARY OF THE INVENTION

It is therefore an object of this invention to provide a method of rapidly compiling an object file from a source file that has been previously compiled It is another object of this invention to provide an apparatus for ensuring the compiling of those portions of an object file which have changed as a result of editing of the source file and avoiding the repeated compiling of unchanged source files These, and other objects of the invention as will be apparent herein are accomplished by organizing an object file into logical blocks corresponding to logical blocks in a source file written in a high level language. An intermediate file, termed an .mdt file, is generated and stores information about the logical blocks in both the source file and the object file and their relationship to each other. Boundaries are established in the source program to define logical blocks within it, each block being termed a function. Each function is further divided into a global region and a local region. A global region is defined as a region in which a given statement may have consequences throughout the entire file. A local region is defined as one in which the consequences of the same given statement are limited to the local region only. The beginning and ending point in each local region in the source file is stored in the .mdt file. Other data about each function and each region is also stored in the .mdt file, such as a check sum byte for each region in the source file, the total number of bytes in the .obj file for each function, the size of each segment at the end of the function .obj file in the codeview type count, and the like. The data which is selected for storage is that data which uniquely identifies the file, each function, each region and which will permit a comparison with the prior .mdt file to determine whether any changes have been made in the source file, and if so, in what region were the changes made. Data about each function and region as compiled in the .obj file is also stored in the .mdt file, such as, the ending point of each function, the number of segments, the number of imports, and the like.

According to the invention, boundaries are established in the .obj file corresponding to similar boundaries in the source file. If a change has been made in a particular local region in the source file, only that region is recompiled. The recompiled portion of the .obj file is patched into the .obj file to replace the previous material corresponding to that region. The .mdt file is updated based on the newly compiled .obj file. If a change has been made in a particular global region in the source file, all functions following that global region are recompiled, because the change may affect all following lines. If the .obj file ending point or segment count changes for a particular function in the .obj file, all functions following are also recompiled and patched into the .obj file. Significant time savings is realized by incrementally compiling the source program because only those local regions which have been changed are recompiled and they are patched into the existing .obj file.

DETAILED DESCRIPTION OF THE INVENTION

Figure 1:
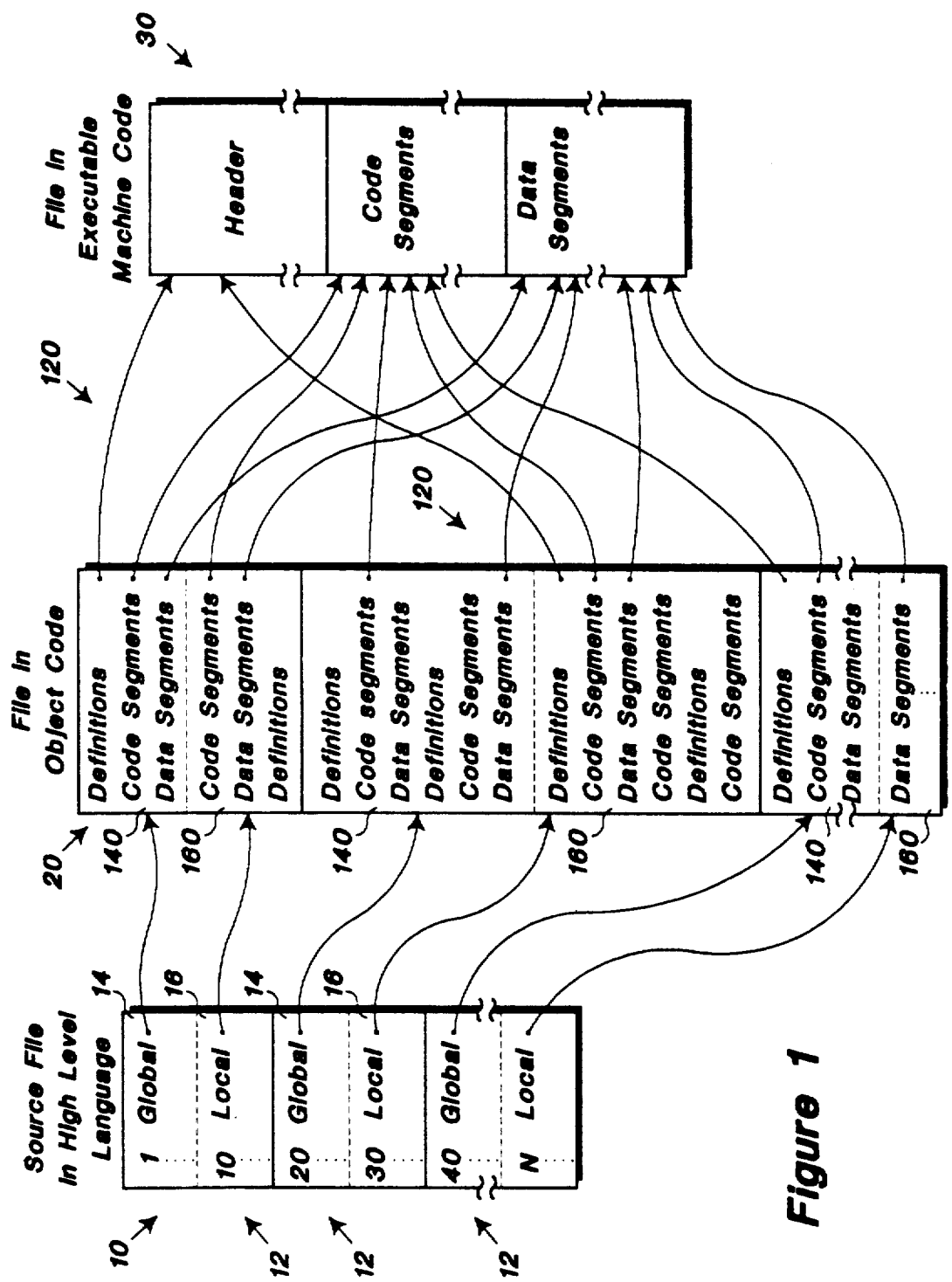
FIG. 1 is a block diagram of a program being compiled from a high level language into object code according to this invention.
Figure 2:
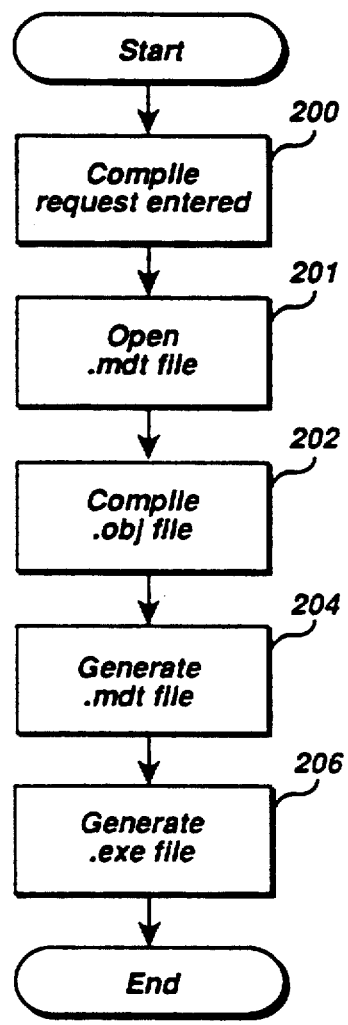
FIG. 2 is a flow chart of a software program for carrying out certain steps of the invention.

FIG. 1 illustrates the steps of FIG. 2 being carried on a source file 10 according to this invention. The source file 10 is written in a high level language A source file 10 is compiled into an .obj file 20 by the incremental compiler of this invention and the .exe file 30 is generated from the .obj file by a linker The generation of an .obj file from a source file and of an .exe file from a .obj file is known in the art, however, the incremental compiler of this invention performs the compile of the .obj file 20 in logical blocks that facilitates incremental compiling and patching blocks of code into the .obj file without affecting other parts of the file, as explained later herein.

As shown in FIG. 2, a compile request 200 to compile an .obj file for the first time from a source file 10 is entered by a user. An .mdt file is opened, step 201, for receiving data generated as the .obj file is created. As the .obj file is compiled, data for the .mdt file is generated and stored in the .mdt file, step 204, as explained in more detail herein. After the .obj file 20 has been compiled, a linker, not part of this invention, generates an .exe file 30, step 206

Figure 3:
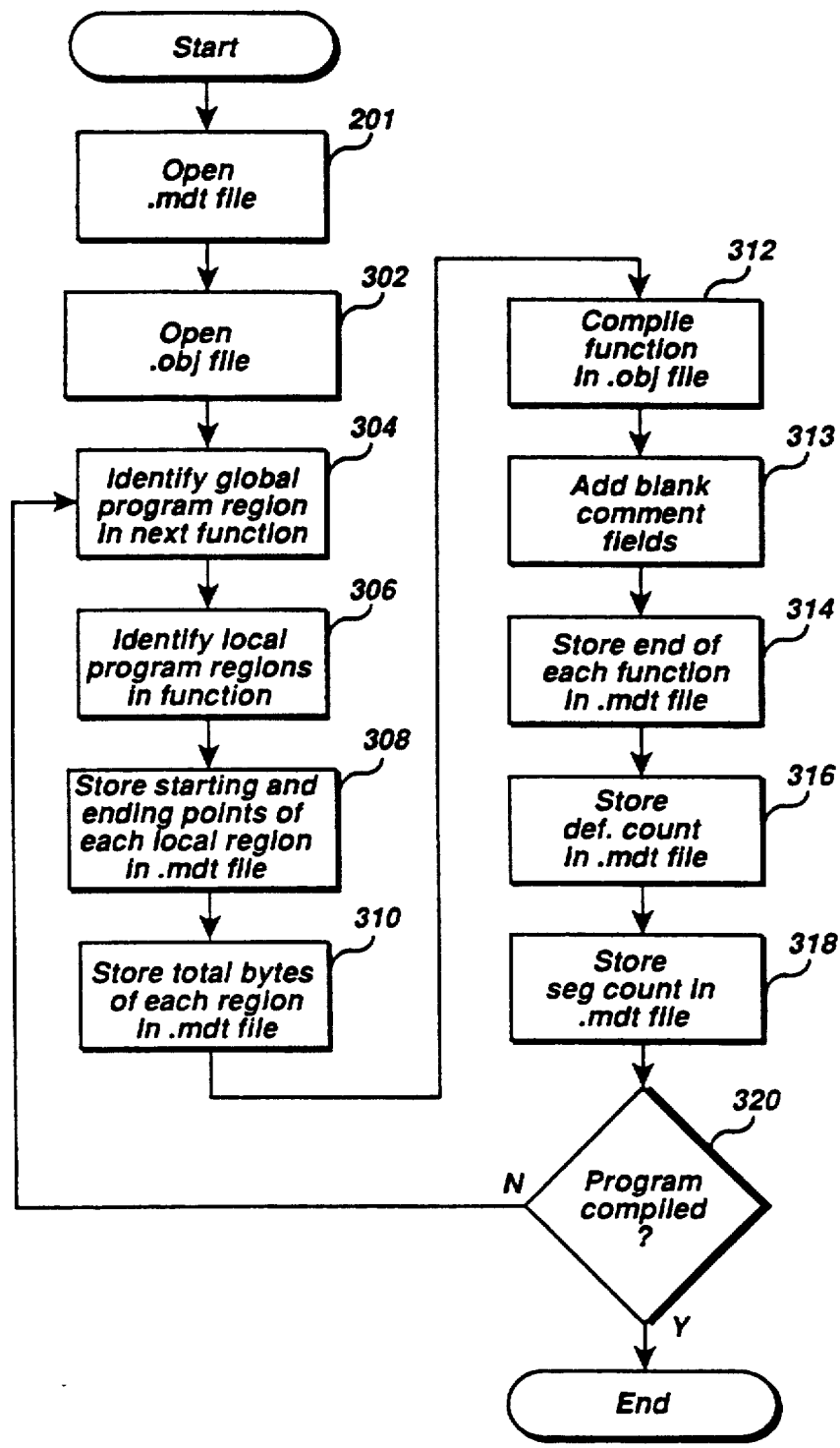
FIG. 3 is a flow chart of a software program for carrying out certain steps of the invention.

FIG. 3 illustrates the specific steps of the incremental compiler generating the .obj file 20 and .mdt file. According to the invention, Boundaries are set in a source file 10, dividing it into functions 12, step 304 and 306 of FIG. 3, the regions being shown in FIG. 1. Each function 12 is divided into a global region 14 and a local region 16. The global region 14 is first and the local region 16 is second within each function 12, the respective regions alternating throughout the file. Global regions 14 are generally much smaller than local regions 16, though this is not required (The first global region tends to be the largest of all global regions because a user places most global information in the first region Later, global regions are usually quite small.) Generally, a global region 14 has in t he range of zero to a few dozen bytes, though it may be any size. (When the global region 14 has zero bytes, it is empty, but it still exists). A local region 16 may range from zero to several thousands of bytes and generally make up the bulk of the function.

A global region is defined as a region in which a given statement may have consequences throughout the entire file A local region is defined as one in which the consequences of the same given statement are limited to the local region only. Thus, if a user edits the file in a global region 14, the entire file following this global region 14 must be recompiled because the edit has the possibility of affecting the remainder of the file. If a user edits the file in a local region 16, only that local region 16 need be recompiled because the affects of statements in a local region 16 are limited to that same local region 16. A preferred high level language for use of this invention is C, though other high level languages such as FORTRAN, Basic, Pascal or the like could be used. In C programming language, a local region 16 is that region between the opening curly, (, and the closing curly, ). A global region 14 within that function is the region which proceeds the opening curly. In other languages, such as FORTRAN, Basic, or the like, global and local regions can also be similarly defined. A local region is determined by the definitions of the particular language and will likely include function calls, subroutines, data arrays, or the like as found in a source file in any language.

In step 308 of FIG. 3, the starting and ending points in the local region 16 of the source file are stored in the .mdt file. One way of storing the beginning and ending points is to store the exact number of bytes of that point from the beginning of the source file 10, though other methods may be used. The total number of bytes of each region 14 and 16 is also stored in the .mdt file, step 310. The .mdt program thus defines and stores the boundary regions between functions 12 and between global regions 14 and local regions 16.

According the invention, non-operational bytes are added in comment fields in the .obj file, step 313 of FIG. 3. The non-operational bytes provide a buffer for additional text to be patched into the .obj file and to provide instructions to the linker when building an new .exe file from a recompiled .obj file that has been incrementally compiled. Comment fields per se in an .obj file are known in the prior art. The purpose of comment fields in the prior art is to provide written clues or instruction to a user trying to trace the function of statements in an .obj file or to provide directions to other utilities operating on the .obj file such as linkers, debuggers, etc. By definition, a comment field does not contain code for execution by the machine, but rather instructions for certain utilities may be placed in a comment field. According to the invention, large blanks are left at the end of some comment fields and additional comment fields are added but are filled with zeros, to permit the .obj file to grow during a recompile without affecting other regions of the .obj file as explained later herein. A further use of comment fields of this invention is provide new line numbers to portions of the .obj file to avoid the need to recompile lines if the only change is a change in line numbers. Both of these features will be explained in more detail in the description of FIG. 5a and 5b.

According to the invention, the logical blocks of each function 12 and each global region 14 and local region 16 as established in the source file 10 are maintained in the .obj file 20, being respectively labeled 120, 140, and 160. The ending point of each function 12 in the .obj file is stored in the .mdt to maintain the location of each block, step 314. Each region is sequentially stored in the .obj file, ensuring that specific regions 140 and 160 correspond to the specific and correct source file regions 14 and 16.

While the sequence of logical blocks from the source file to the .obj file remains the same, the size does not. A source file of only a dozen lines will likely generate an .obj file several hundreds of bytes long. A short local region 16 may correspond to a page of text in the .obj file, or vice-versa Generally, a global region 14 will be quite short in the .obj file and compile very quickly, whereas a local region 160, even from a short source file local region 16 may be quite long. Compiling of a source file 10 into an .obj file is known in the art. The appropriate definitions, code segments, data segments and other instructions for providing machine readable code are generated to produce the .obj file in any manner well known in the art, the generating of the particular machine executable instructions in the .obj file not being a part of this invention per se. The maintaining of Boundaries in the .obj file corresponding to the boundaries of the source file is, however, an aspect of this invention Other data from the .obj file 20 is stored in the .mdt file as the .obj file is compiled. The number of imports used in each region is stored, step 316 The number of segments of each region and their respective sizes are also stored, step 318. The data stored in the .mdt file is that data which indicates whether there has been a change in the .obj file 20 which will require a recompile of following functions rather than an incremental compile.

Figure 4A:
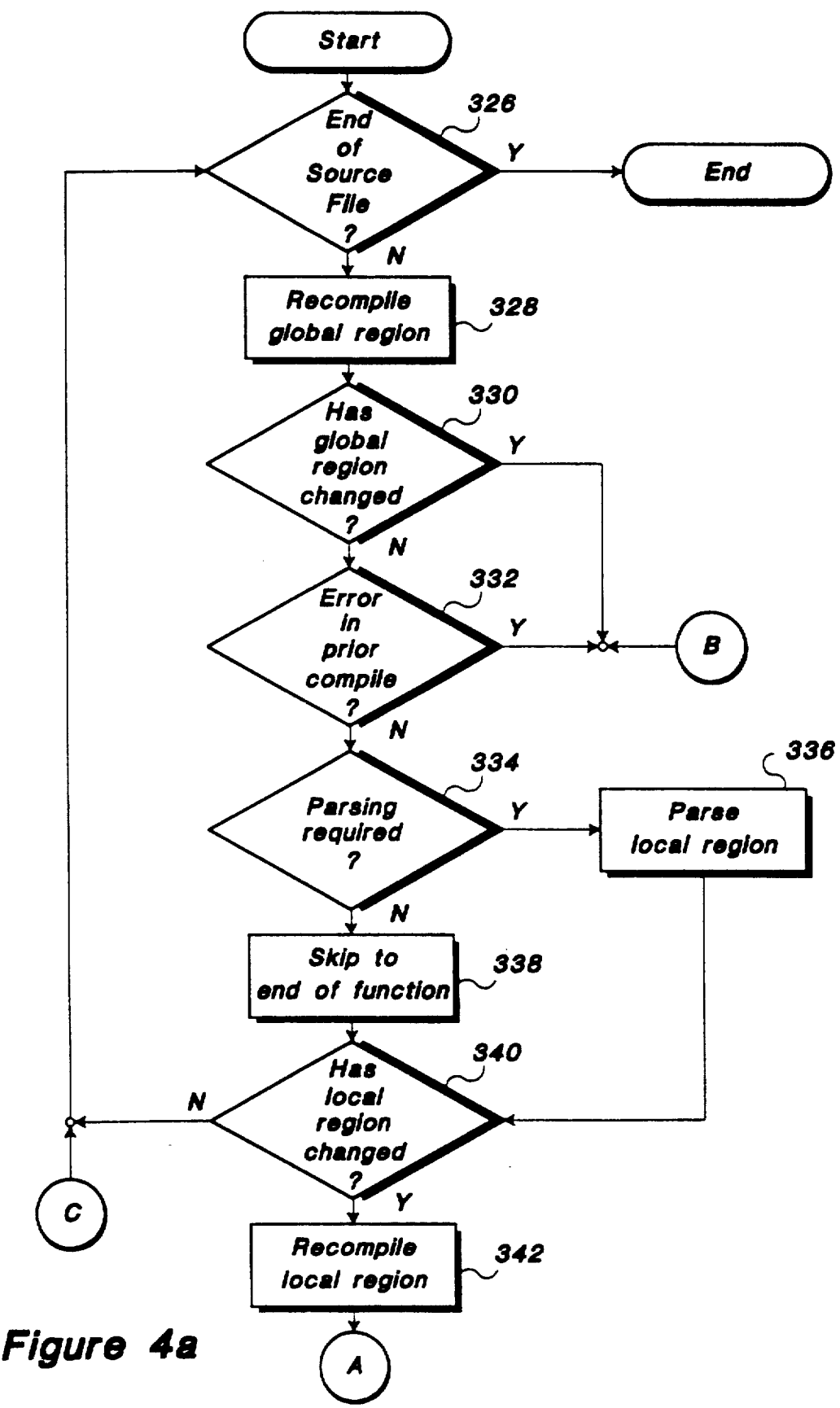
FIGS. 4a and 4b are flow charts of a software program for carrying out certain steps of the invention.
Figure 4B:
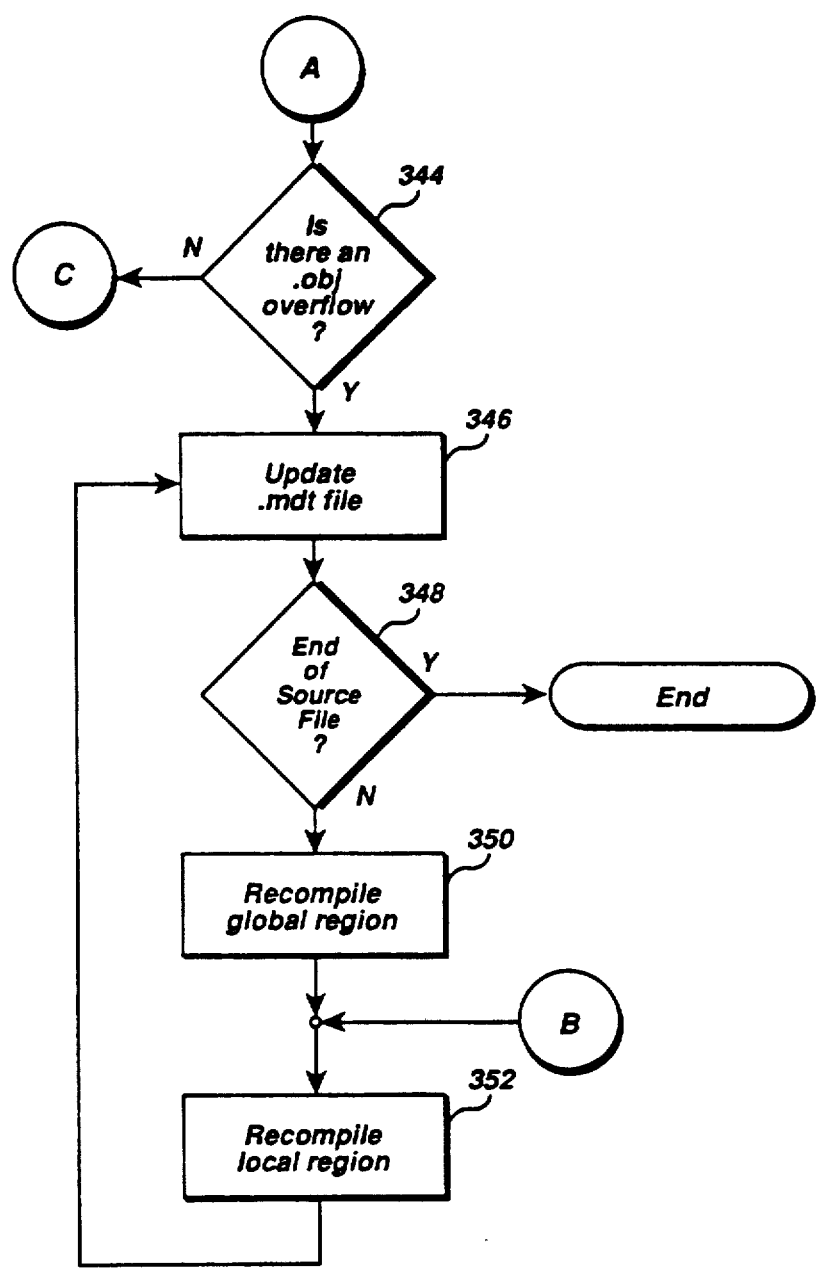

FIGS. 4a and 4b are flow charts of an incremental compiler stepping through a source file a second time to determine whether or not a recompile of each individual local region 14 is required. The incremental compiler can select one of three options when recompiling a local region 14 of a source file 10. The local region can be skipped completely. Any local region 14 that is recompiled is patched onto the .obj file, fitting into its previous position. The local region 14 can be parsed by the incremental compiler but not compiled, explained in more detail later. A third option is a full recompile of the local region 14 and the patching of it into the existing .obj file as described elsewhere herein.

As shown in FIG. 4a, if the end of the source file has been reached, a "no" in step 326, the incremental compilation ends. If the incremental compiler has not reached the end of the source file, a "yes" in step 326, the next global region is compiled, step 328. After the next global region is compiled, a comparison is performed in the .mdt file to determine if the global region has changed, step 328. If the global region 14 has changed, a "yes" in step 330, the incremental compiler jumps to step 352 and recompiles the local region 14 of that function. A recompile of all the following functions is forced by advancing to step 352 and repeating steps 346-352 to the end of the source file. If the global region has not changed, the incremental compiler must check to see if an error occurred in the next region in the previous compile, step 332.

During a first compile, many errors are likely in the source file which the user must correct. For certain types of errors, the incremental compiler stops compiling and stops generating the .obj code immediately upon reaching the error and outputs to the user that an error has been found. The incremental compiler then parses the rest of the source file after such errors, but does not generate additional .obj file code. Additional errors found by the incremental compiler during the parsing are also output to the user. If this type of error occurred in a prior compile, an error flag is set, a "yes" in step 332 and a recompile of all the following functions is forced by advancing to step 352 and repeating steps 346-352 to the end of the source file. If there was not an error in the prior compile, a "no" in step 332, the incremental compiler continues.

If parsing of the local region is required, a "yes" in step 334, the local region is parsed, step 336. Parsing is required if special statements that may have a global affect are within a local region 14. For example, if the user has placed a #define statement in a local region, that region must be parsed each time to ensure that changes are recognized. (Such statements are almost always placed in a global region, but are not strictly required to be. Parsing of local regions is thus not common, but may occur.) Statements other than a #define statement may also require parsing of the local region each time that region is recompiled, depending on the possibility of global affect of a particular statement. If parsing is required, a parsing flag is set when the source file 10 is first compiled for that local region. The incremental compiler is thus alerted prior to examining each local region that a parsing is required, a "yes" in step 334. If a parsing is required, the local region 14 is parsed. (Parsing is a term whose function known in the art. The term refers to the incremental compiler examining the source code for context, syntax and form, among other things.) After parsing, the incremental compiler then tests to see if the local region has changed, step 340 as explained elsewhere herein. If the parsing flag is not set, a "no" in step 334, the incremental compiler skips to the end of the function, step 338.

When the incremental compiler skips to the end of the function, step 338, the entire local region is skipped over. If the local region has not changed, a "no" in step 334, the incremental compiler returns to step 326 to determine if the end of the source file has been reached. The loop of steps 326-340 continues until the end of the source file. If no, or few changes in one local region, have been made in the source file, the complete recompile will occur relatively quickly and the new .obj file provided to the user.

If the local region has changed, (or if a rude construct is within the local region as explained elsewhere herein), the local region must be recompiled, step 344. After the local region 16 is recompiled, the recompiled text may overflow into other regions of the .obj code. If it does not overflow, a "no" in step 344, the incremental compiler returns to step 326 and continues the incremental compiling of the source file as previously explained. If there is an overflow, "yes" in step 344, a complete recompile of all following functions is required and loop 346-352 is entered.

Figure 5A:
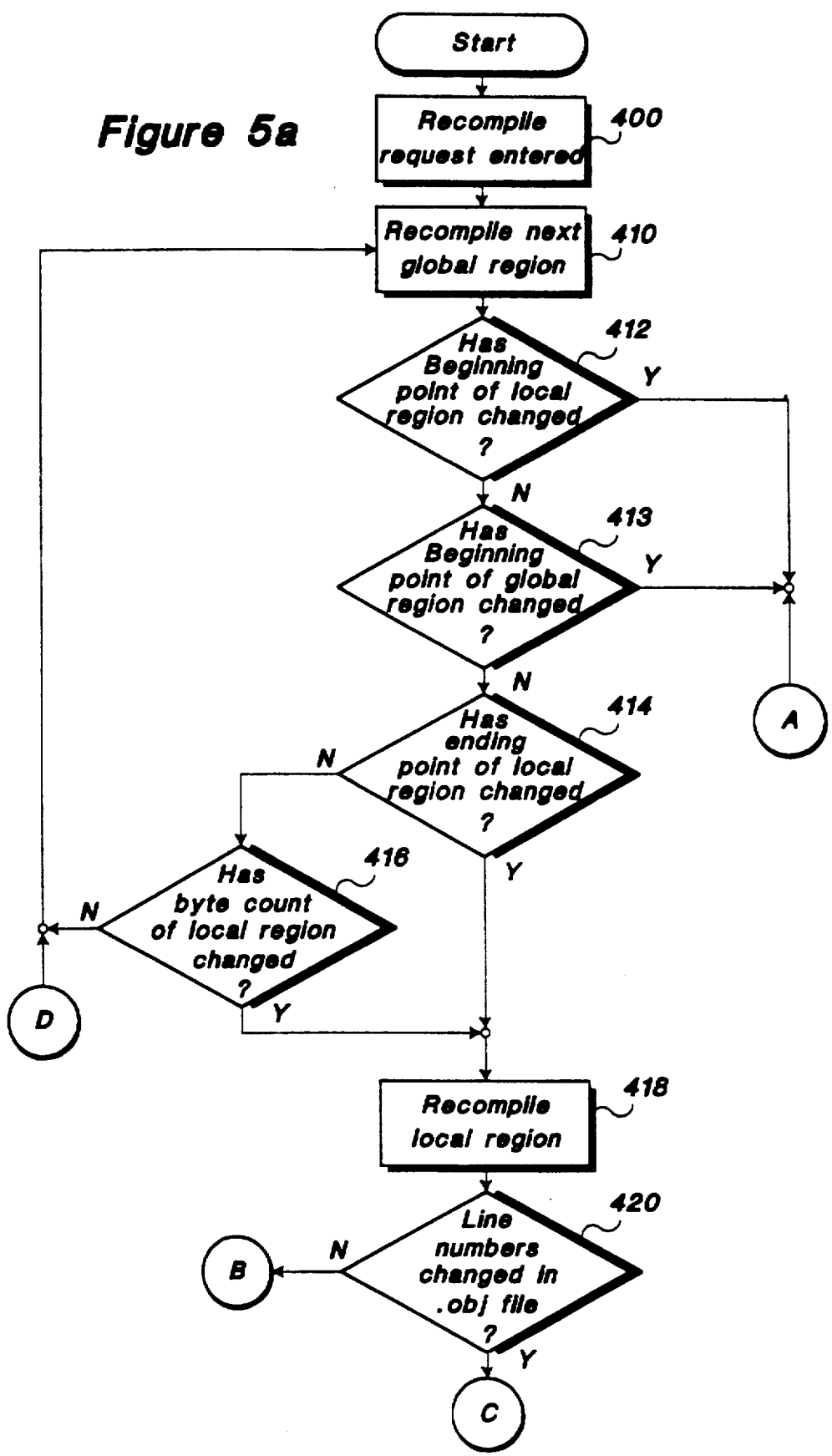
FIGS. 5a and 5b are flow charts of a more detailed set of steps for carrying out the invention.
Figure 5B:
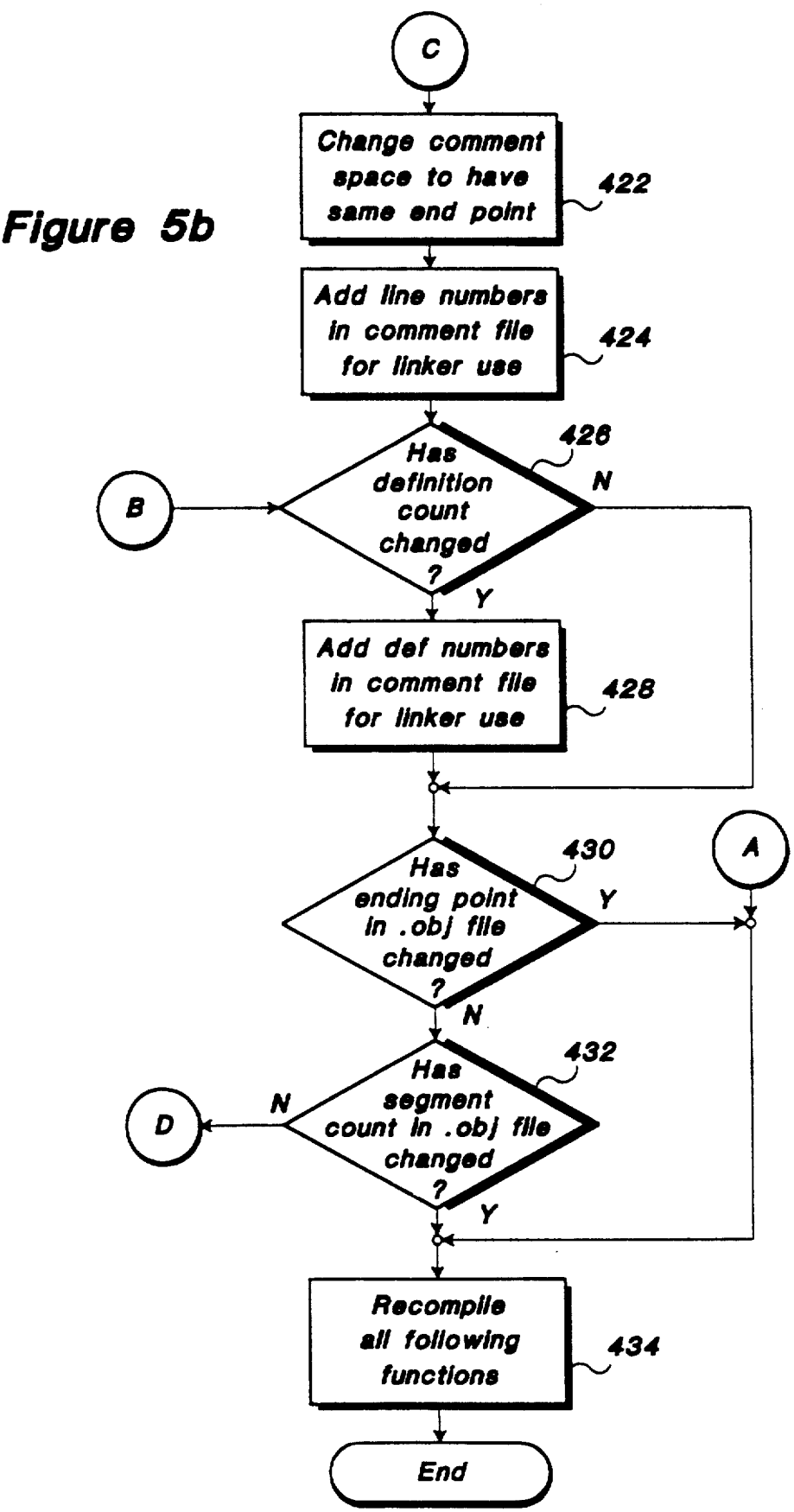

FIGS. 5a and 5b illustrate the recompiling of an .obj file 20 from a source file 10 using the incremental compiler of this invention. When a source file 10 is first compiled, an .obj file and .mdt file are generated and saved, FIG. 2. Later on, the user may edit the source program and then run the program again. If the source program has been previously compiled, it must be recompiled to generate code corresponding to the edited text. An .obj file and .mdt file corresponding to that source file 10 exist if the source program has been previously compiled. A compile request thus becomes a recompile request, step 400.

The incremental compiler compiles the next global region in the source file into object code, step 410. If the compiler is at the start of the file, this will be the first global region in the file. The recompiled global region is patched onto the same corresponding section of the previous .obj for that source file. That is, the compiled code for this global region is written on top of and replaces the corresponding global region of the .obj file. A check is then performed to determine if the beginning point of the local region 16 within that same function 12 of the source code 10 has changed, step 412. Data is read from that stored in the .mdt file to determine the previous beginning point of the local region 16 within that function 12. If the beginning point has changed, a "yes" in step 412, this indicates that there has been a change in the global region 14 just compiled and all following functions in the source file 10 must be recompiled, step 434. However, if the global file has not been edited, the beginning point in the local region 16 will be the same, a "no" in step 412.

The incremental compiler will then compare the check sum in the just compiled global region 14 with the current check sum in the same global region in the previous compile as stored in the .mdt file. A check sum is the sum of the value of all the bytes in that region. Thus, if one byte is changed for another, the check sum value will change. If the check sums are the same, a "no" in step 413, it is certain that the global region 16 has not changed and the incremental compiler steps to the local region 16 of that function to determine if the local region in that function must be compiled. If the check sum of the global region has changed, a "yes" in step 413, the incremental compiler forces a compile of all following functions in the source, step 434 as previously described with respect to FIG. 4b, steps 346-352.

To test the need to recompile a local region 16, the incremental compiler skips the entire local region and seeks the ending point of the local region 16, as part of step 414. If the ending point of the local region 16 is not the same, a "yes" in step 414, that local region must be recompiled because it is certain that there was an edit in the local region 16. Again, a comparison between the data in the .mdt file and the current source file 10 indicates whether the ending point has changed. If the local region 16 is recompiled, it is patched into the existing .obj file. If the ending point of the local region 16 had not changed, a "no" in step 414, it is likely that no edits were made in the local region 16, but not certain. The comparison of the ending point provides a quick first check to determine if a change has been made. To determine for certain whether an edit has been made in the local region, the check sum of the local region is compared to the stored check sum of the same region in the .mdt file. If the check sum has changed, the local region is recompiled and patched onto the existing .obj file 20 in the appropriate block, step 416. If the check sum is the same, a "no" in step 418, no change has been made in this local region. The local region is not recompiled and the incremental compiler returns to step 410, jumps to the next function (and global region) in the source file 10 and repeats steps 410-416 as described. Significant savings in computer time and user time are realized by the ability to skip over and not recompile unedited text. Because local regions are generally large, (some of them being very large) compared to global regions, the selective skipping of the compiling of local regions which have not changed while permitting the patching in of regions that have changed provides significant benefits. Steps 410-416 are repeated on all functions through out the source file 10. If an edit has been made in only one or two local regions, only those local regions are recompiled, patched in and a new .obj file is generated very quickly corresponding to the edited source file. A file that may have taken several minutes to compile initially may be recompiled in a few seconds if all changes are within a few local regions, as is quite common. Some time savings and space savings is sacrificed in the initial compile because of the generating of the .mdt file and the organization of the .obj file, but these are more than recaptured in the incremental compiling of the source file and patching into the .obj file due to editing of the source file 10.

In some instances, editing of the local region 16 may require additional incremental compiling because of changes caused in the .obj file 20. The .obj file occupies a definite space in memory 506 (see FIG. 6) and each region is sequentially stored one after the other in the memory space. Frequently, (but not always), the editing of the source file and recompiling of the local region 16 adds more bytes to that local region of the .obj file. If bytes are added, a "yes" in step 420, the bytes must stored within the same local region 160 in the same logical block to permit continued patching into the .obj file by the incremental compiler.

According to the invention, comment fields are used to aid in keeping the local region 160 within the same logical block of memory. When the .obj file 20 if first generated, one or more large comment fields full of blanks are generated. The "blank" comment fields do not correspond to text and are provided to facilitate later editing as now explained. The blank comment fields occupy space in memory in the same logical block as the local region 160. Because the space is taken up by comment fields, machine execution is not affected by their existence, the machine ignoring comment fields When additional text is added to an .obj file, the size of one or blank comment fields is correspondingly reduced, freeing up that amount of memory space for the new generated code and data segments Because the comments are full of blanks, deleting them does not affect the user or the machine. The addition is accomplished by adding into the .obj file 20 local region 160 the added text. The recompiling of the same local region 160 continues to the end of the region. The incremental compiler then shrinks the blank comment field the appropriate amounts to force the ending point of the .obj file in memory to remain the same, step 422. A blank comment field is stored at the end of each local region for this purpose. After the incremental compiler has completed the recompile, the ending point will be the same in the .obj file memory 506, even though the number of blank spaces in the comment fields may have been decreased. Similarly, if the edit is of the type that removes text from a local region, the size of the blank comment fields is increased so that the local region 160 occupies the same location in .obj memory 506. If the local region has significant data segments, blank comment fields may be added behind or as part of the data segments to facilitate the user adding data to the file without having to recompile the entire file. The amount of blank comment field provided may thus vary from local region 160 to local region 160, enough being provided to accommodate for minor edits. The providing of blank comment fields in effect reserves a block of memory for each local region to expand into during later edits, avoiding the need to recompile later local and global region due to memory address changes.

If lines of text have been added to (or deleted from) the source file 20, the lines must be renumbered in all following regions to ensure that a patch into the .obj file does not alter the reference to lines in the source file. The incremental compiler uses the previously described blank comment fields to provide directions to the linker indicate of the line change. Each region 160 has a blank comment field at the end of the region for providing instructions to the linker. If line numbers are added in the source file, the number of line numbers added is written into the first two bytes of that ending blank comment field. The linker (and incremental compiler if necessary) reads these first two bytes and adds their value to all subsequent line numbers source file when building the .obj and .exe file to ensure that references to other line numbers of later local regions match up. Providing the number of lines added to (or deleted from) the source file permits the incremental compiler to avoid compile following local regions. Data of the correct line number is carried in the comment field of the each local region that is recompiled, 160, avoiding the need to recompile following local regions merely because of a line number change in a previous region.

The import records in the .obj file 20 are counted and treated in a similar way as line numbers. If the import count has changed, a "yes" in step 426, the change in count, whether positive or negative, is written into the second pair of bytes of the blank comment field at the end of each local region 160, step 428. (The first pair being used by the line number bytes, as described.) If the definition count has not changed, step 428 is skipped.

After each local region 16 which has been edited is recompiled into local region 160 and the appropriate changes made to the blank comment fields, the ending point of that function is compared with the previous ending point as stored in the .mdt file. Sometimes sufficient lines or data is added that the blank comment fields are not sufficiently large to accommodate for the changes. That is, all the blank comment fields are deleted to make room for additional code and there is still not room for the recompiled code. The local region 160 of the .obj file thus exceeds its previous memory block and may write on top of one or more other blocks of memory. If the ending point has changed, a "yes" in step 430, all functions following that region must be recompiled, step 434 to ensure that the linker to provided a full copy of the correct .obj code. If the ending point has not changed, "no" in step 430, a comparison to the segment count and their sizes in the .obj file is performed, as stored in the .mdt file. If the segment count has changed or a segment exceeds its previous size, a "yes" in step 432, a full recompile of all following regions must be performed. If the segment count has not changed and all segments are within their previous sizes, a "no" in step 432, the incremental compiler patches the local region 160 into the object file and returns the next global region, step 410, repeating steps 410 to 416 or 410 to 434 as necessary on the remainder of the file.

In testing to determine if the segment count has changed or the size of any segment has changed, step 432, the incremental compiler performs testing on special debugging segments and debugging information in the same step. Some programs aid the user in debugging a program; such as Codeview ™ sold by Microsoft. Special debugging information is stored in the .obj file for use by debuggers, such as Codeview ™ or others. Two segments are devoted to debugging information and these are treated as other segments are in determining whether a recompile is required The number of types and number of symbols provided for the debugger are stored in the .obj file Extra space is provided in the .obj file for adding types and symbols to the debugger program. Extra space is provided for code segments and data segments by providing comment fields full of blank bytes, as has been previously described. Extra space is provided for the addition of types and symbols in a slightly different way. When the types are sorted and stored in the .obj file as it is first compiled, they are sequentially numbered. The implicit ordering of types is sequential, from one number to the next to correspond to each type sequentially. According to the invention, space for types is padded, that is, provided, by providing an ordering of the next type in the index that skips several numbers. The linker is ordered to start on a specific type as the next record. For example, if on type is the tenth one, the linker may be order to start on the twentieth one next. Ten spaces are thus left at that point to insert additional types. If a later edit of the source file creates additional types for the debugger, the space between the tenth and twentieth spots is filled. The incremental compiler will automatically jump to the next twentieth spot after the next type that has been added. If more than ten types are added in this region, a "yes" in step 432, a full recompile of the following functions will be required, step 434.

Space for adding symbols for use by the debugger is provided by adding non-operational bytes, termed "no-ops" at selected locations within the .obj file. If the number of symbols increases, the no-ops are overwritten by the new symbols. If more symbols are added then no-ops provided, all the following functions must be recompiled, step 434.

There may be exceptions to the general rule of statements in the local region affecting only lines within the same local region. Though not often used, a statement known as a "rude construct" may exist in a local region. A rude construct is one which always has consequences throughout the whole file, no matter whether it is in a local region or a global region. The rude construct depends on the statement; not on its location within the file. For example, if a statement requires that the current date and time be used to affect execution of the file, such a statement would be a rude construct and requires the recompiling of all functions following it, whether it is in a local region or a global region. (Obviously, the time will change each time the source file 10 is recompiled into an .obj file.) There are a few other rude constructs, as will be apparent to those of ordinary skill in the art. Thus, if a statement is of the type that affects tho whole file if it is edited or always affects the file, the whole file must be recompiled if it is edited.

Figure 6:
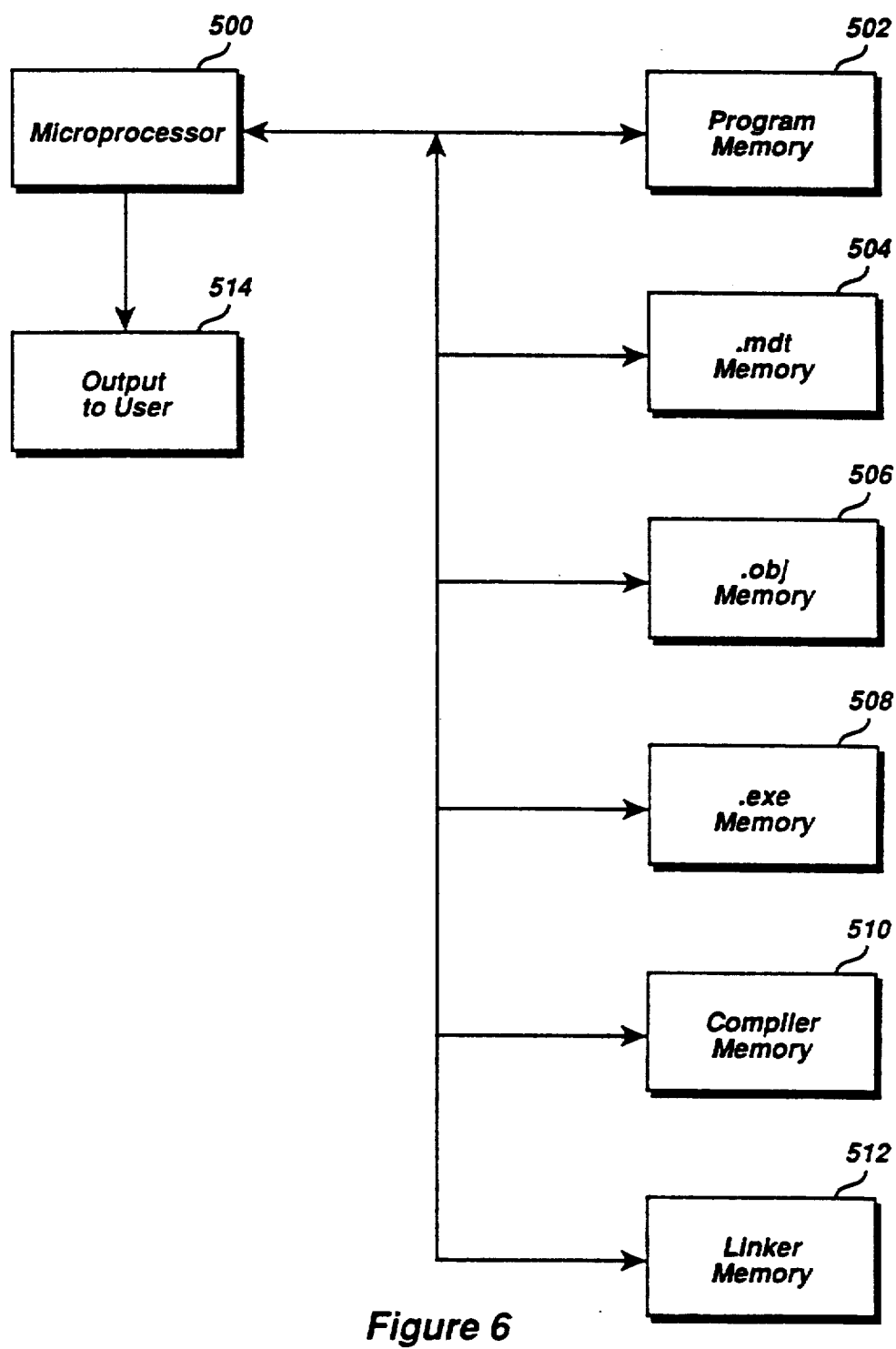
FIG. 6 is a block diagram of an apparatus for carrying out this invention.

FIG. 6 is a block diagram of hardware for carrying out the invention. A microprocessor 500, such as an Intel 80286, 80386 or the like, is controlled by the software program of the invention Various memories are coupled to the microprocessor 500 including a program memory 502, a .mdt memory 504, an .obj memory 506, an .exe memory 508, a compiler memory 510 and a linker memory 512. Other memories may be provided as needed. The memories may be in DRAM, on floppy disks, hard disks, CCD's or the like. An output device for outputting to a user is also provided. The output device may be a CRT, LCD screen, a printer or the like to provide a user understandable output.

We claim:

1. The method of incrementally compiling a source file into an object file comprising:
    compiling a first version of a source file into a first version of an object file;
    storing data corresponding to check points within said source file;
    storing data corresponding to check points within said object file;
    editing said source file;
    recompiling a portion of said source file which includes said edited region of said source file and patching it into said first version of said object file to create a second version of said object file, said portion that is recompiled being selected using said stored check points within said source file and said stored check points within said object file.

2. The method according to claim 1 further including generating a comment field in said object file, said comment field being full of blanks for permitting additional object code to be added within said region and a corresponding amount of blank spaces to be deleted from said comment field whereby said ending point in said object file remains the same.

3. The method according to claim 2, further including:
    storing line number information in said comment field when recompiling a portion of said source code and deleting a corresponding amount of blank spaces from said comment field whereby the ending point in said object file remains the same.

4. The method according to claim 2, further including storing additional useful code in said object file within said comment field, said comment field being previously full of blank space in said first version of said object file and containing useful code in a second version of said object file.

5. The method according to claim 1 wherein said check points in said source file include an ending point in a local region of said source file.

6. The method according to claim 1 wherein said check points in said source file include a check sum of a local region of said source file.

7. The method according to claim 1 wherein said check points in said object file include an ending point of a local region of said object file.

8. The method according to claim 1 wherein said check points in said object file include a segment count of a local region of said object file.

9. An apparatus for compiling a higher level computer language into an object file language comprising:
    means for storing an ending point of a local region within a first version of a source file, said source file being in said higher level computer language;
    means for compiling said source file, including said local region, into a first version of an object file written in said object file language, said means for compiling being coupled to said means for storing;
    means for storing an ending point of said local region within a second version of said source file;
    means for comparing said ending point of said local region of said second version of said source file with said ending point of said first version of said source file, said means for comparing being coupled to each of said means for storing;
    means for causing the compiling of said local region a second time creating a second version of said object file written in said object language; and
    means for writing said local region in said object language on top of a corresponding region in said object file if said ending point has changed, creating a second version of said object file, said means for writing being coupled to said means for compiling.

10. The apparatus according to claim 9 further including means for storing blank comment lines within said local region of said first version of said object file, said blank comment lines taking up space in said means for storing but not containing useful code information.

11. The apparatus according to claim 10 wherein some of said blank comment lines are replaced with useful code in said second version of said object file.

12. The apparatus according to claim 9, further including:
    means for creating a comment field within said local region of said first version of said object file; and
    means for storing line number information in said comment field in a second version of said local region of said object file.

13. The apparatus according to claim 9 wherein said means for comparing further includes:
    means for testing of said local region to determine if said local region must be recompiled to create a second region of said local region in said object file.

* * * * *